US012611678B2

(12) United States Patent
Dair et al.

(10) Patent No.: US 12,611,678 B2
(45) Date of Patent: Apr. 28, 2026

(54) SEPARATION OF FLUIDS CONTAINING SOLIDS

(71) Applicant: World Water Works, Inc., Oklahoma City, OK (US)

(72) Inventors: Daniel R. Dair, Warwick, RI (US); Kyle L. Booth, Oklahoma City, OK (US); John R. Tessandori, Erlanger, KY (US)

(73) Assignee: WORLD WATER WORKS, INC., Oklahoma City, OK (US)

( * ) Notice: Subject to any disclaimer, the term of this patent is extended or adjusted under 35 U.S.C. 154(b) by 1033 days.

(21) Appl. No.: 17/387,076

(22) Filed: Jul. 28, 2021

(65) Prior Publication Data

US 2022/0032323 A1 Feb. 3, 2022

Related U.S. Application Data

(60) Provisional application No. 63/060,288, filed on Aug. 3, 2020.

(51) Int. Cl.
| | |
|---|---|
| *C02F 1/24* | (2023.01) |
| *B03D 1/14* | (2006.01) |
| *B03D 1/24* | (2006.01) |
| *C02F 3/12* | (2023.01) |

(52) U.S. Cl.
CPC ............. *B03D 1/24* (2013.01); *B03D 1/1481* (2013.01); *C02F 3/1205* (2013.01); *C02F 2203/004* (2013.01)

(58) Field of Classification Search
None
See application file for complete search history.

(56) References Cited

U.S. PATENT DOCUMENTS

| | | | | |
|---|---|---|---|---|
| 2,888,139 | A | * | 5/1959 | Fischer ............... B03D 1/1462 |
| | | | | 210/221.2 |
| 9,670,083 | B2 | | 6/2017 | Wett et al. |
| 10,112,856 | B2 | | 10/2018 | Bott et al. |
| 2014/0144836 | A1 | | 5/2014 | Nyhuis et al. |

FOREIGN PATENT DOCUMENTS

| | | | |
|---|---|---|---|
| WO | 2001046075 | 6/2001 | |
| WO | 2011091452 | 8/2011 | |
| WO | 2016154646 | 10/2016 | |
| WO | 2016172749 | 11/2016 | |
| WO | WO-2018187639 A1 * | 10/2018 | ............... C02F 9/00 |
| WO | 2019109116 | 6/2019 | |

* cited by examiner

*Primary Examiner* — Peter Keyworth
(74) *Attorney, Agent, or Firm* — McAfee & Taft

(57) ABSTRACT
The methods and systems provide for the improvement in the separation of different portions of solids particles, such as bacteria, from a process stream. The methods use gas and control of fluid flow within a tank zone to provide for separation that is more selective.

17 Claims, 6 Drawing Sheets

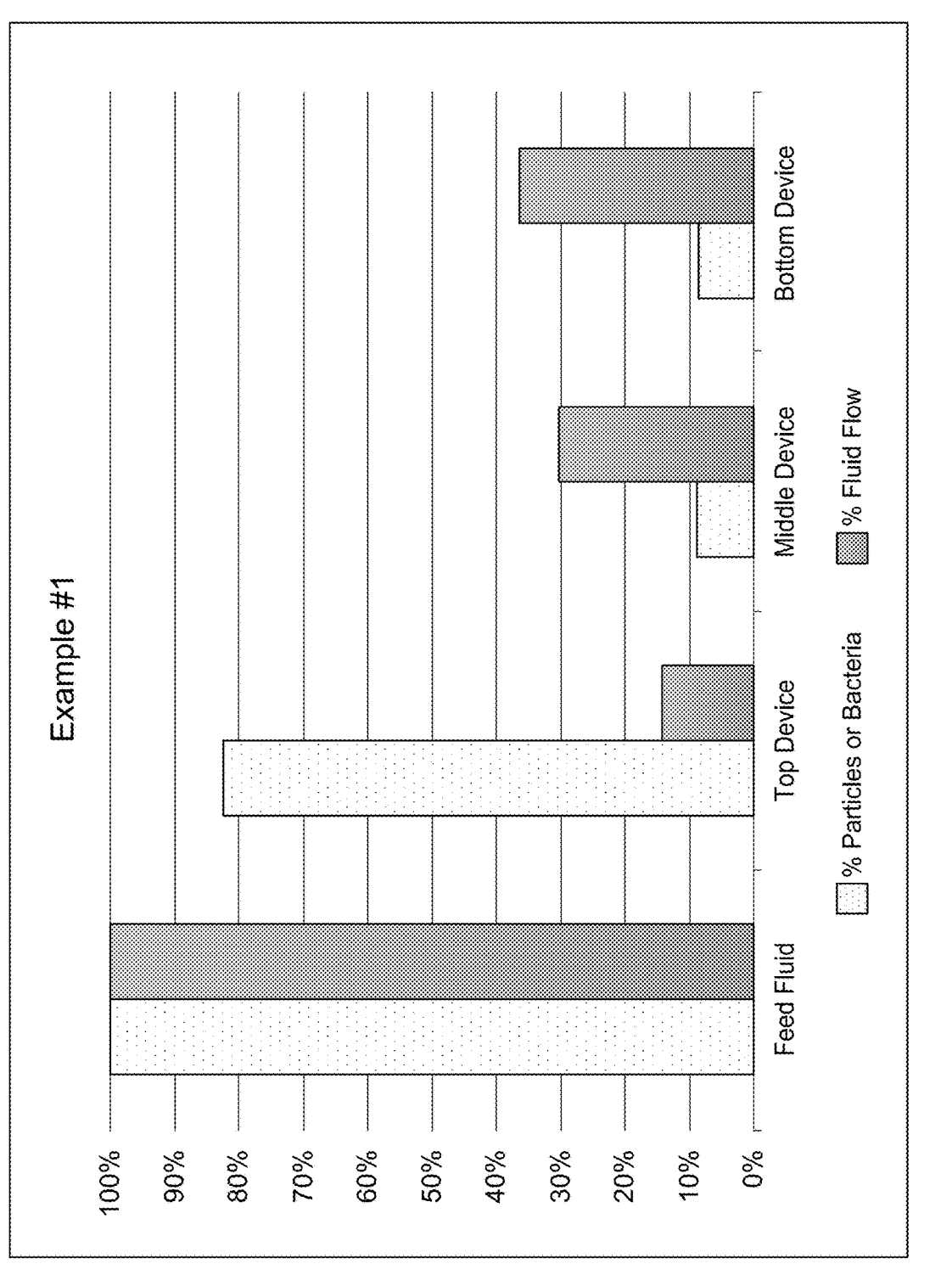

SEPARATION OF FLUIDS CONTAINING SOLIDS

CROSS REFERENCE TO RELATED APPLICATION

This application claims the benefit of U.S. Provisional Patent Application No. 63/060,288 filed on Aug. 3, 2020, the disclosure of which is hereby incorporated by reference.

FIELD

This disclosure relates to systems and methods for separation of process streams containing fluids with solids particles, and is particularly applicable to separating process streams resulting from processes for the treating of wastewater.

BACKGROUND

Technology areas, such as wastewater treatment and biopharmaceutical production, utilize processes that result in process streams containing fluids with solids particles. Such solids particles can contain active bacteria and/or inert fractions of solids. Often it is desirable to separate out different portions of the solids particles so that some portions can be redistributed or recycled to the process, and other portions can be disposed of or further processed.

For example, an activated sludge process of wastewater treatment utilizes active bacteria to treat the wastewater also known as mixed liquor suspended solids (MLSS). The activated sludge process can be operated under aerobic, anoxic and/or anaerobic conditions in order to yield different removal results. It is not unusual to use two or more such conditions back-to-back to treat the wastewater, since different bacteria are used for aerobic, anoxic and anaerobic conditions. The process stream coming from the process may contain two or more different types of bacteria as part of the solids particles. It can be desirable for these differing bacteria to be separated from each other so that one can be re-introduced back into the process and the other removed for further processing.

In the past, various separation techniques have been proposed that rely on the intrinsic density of the solids. In most cases, these devices are operated by separating the solids from the liquid via gravity. The separation does not allow for density classification and discreet density differences cannot be selected. Other devices rely on increasing the apparent density through cyclonic action. The process allows for the classification of denser particles and provide a decreased separation of density. However, even with such devices, it can be difficult to control the separation and content of the recycle stream as it only allows for two density classes, high and low.

Accordingly, better separation techniques that offer increased control over the recycle streams are needed.

SUMMARY OF THE INVENTION

As disclosed herein, systems and methods for selectively separating solids from a process stream form a process, such as a fluid treatment process or production process. While the invention has wider applicability, a typical area where it is useful is in separating biological treatment of wastewater.

In one aspect, the present disclosure provides a method comprising introducing the process stream into a tank zone having an upper portion, a lower portion and a mid-portion between the upper portion and lower portion. The process stream is a process liquid containing solids particles, such as active bacteria and/or inert fractions of solids. In the method, a gas-containing stream is introduced into the tank zone so as to generate gas bubbles in the process liquid stream wherein the gas bubbles attach to a first portion of the solids particles thus promoting upward flow of the first portion of the solids particles within the tank zone. Generally, this upward flow is caused by the bubbles decreasing the density of the solids particles to which they are attached. The less dense and smaller particles will tend to flow upwards due to the bubbles, while the more dense particles and larger particles will tend to flow downwards.

The method provides for at least three streams to be removed from the tank zone so that the first portion of the solids particles are removed from the upper portion, a second portion of the solids particles is removed from the mid-portion, and a third portion of the solids particles is removed from the lower portion.

In the process, the flow of process liquid within the tank zone is controlled so as to control amounts of solids particles in the first portion, second portion and third portion. In the embodiments, the control of the flow of process liquid by controlling the flow through one or more of the tank zone outlets. For example, the third portion of solids is removed from the lower portion by flow of process fluid through a lower outlet in the lower portion of the tank zone, and the second portion of solids is removed from the mid-portion by flow of process fluid through a mid-outlet in the mid-portion of the tank zone. The flow of process liquid within the tank zone is then controlled by changing the flow through the lower outlet, the mid-outlet or both.

In the above embodiments, the process fluid forms an upper surface within the tank zone, and the first portion of the solids is removed by skimming off the upper surface or by simply overflowing the tank.

Generally, in the above separation methods, the average density of the third portion is greater than average density of the second portion, and average density of the second portion is greater than average density of the first portion. Also, typically a portion of the second portion can be reused in the treatment or production process, such as by recycling a portion of the second portion back to the treatment or production process, and the entire third portion can be recycled back to the treatment or production process. Additionally, the entire first portion is removed for further processing.

In embodiments, the process stream is from a wastewater treatment process and the solids particles include bacteria.

BRIEF DESCRIPTION OF THE DRAWINGS

FIG. 5 is a graphical representation of percentage of solids particles for each effluent stream of the currently described method when there is about 37% underflow.

FIG. 6 is a graphical representation of percentage of solids particles for each effluent stream of the currently described method when there is about 22% underflow.

DESCRIPTION

Figure 1:
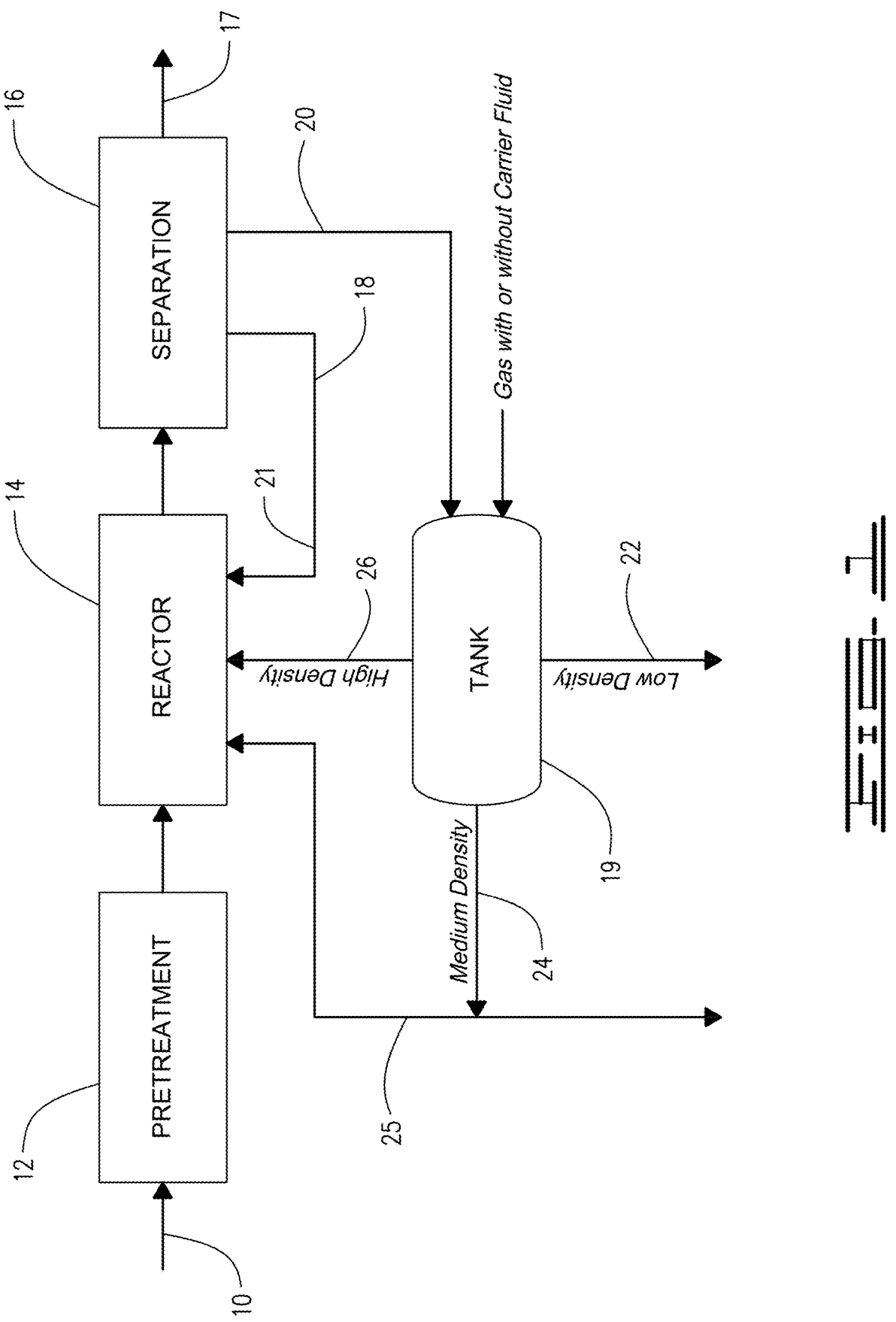
FIG. 1 is a schematic representation of a biological treatment process in which the separation method of the current disclosure may be useful.

The present disclosure may be understood more readily by reference to the following description. In addition, numerous specific details are set forth in order to provide a thorough understanding of the embodiments described herein. However, those of ordinary skill in the art will understand that the embodiments described herein can be practiced without these specific details. In other instances, methods, procedures and components have not been described in detail so as not to obscure the related relevant feature being described. Additionally, the description is not to be considered as limiting the scope of the embodiments described herein.

Referring now to the drawings, wherein like reference numbers are used herein to designate like elements throughout the various views, various embodiments are illustrated and described. The figures are not necessarily drawn to scale, and in some instances the drawings have been exaggerated and/or simplified in places for illustrative purposes only. Where components of relatively well-known designs are employed, their structure and operation will not be described in detail. One of ordinary skill in the art will appreciate the many possible applications and variations of the present invention based on the following description.

The following describes a system of equipment whose individual benefits work to provide a superior solution with more flexibility, for separating solids from a process stream from a treatment or production process. The process can most easily be understood as separating the process stream into at least high-density stream, a medium-density stream, and a low-density top portion. The high-density stream has solids particles that have an average density that is greater than the average density of the solids particles in the medium-density stream, which in turn has a greater average density than the solids particles in the low-density top portion. Further, the process provides control so that the amount taken off as the high-density stream can be increased or decreased, as further explained below.

While generally the process is applicable to any process stream having solids particles of various density, it is particularly suitable for wastewater treatment and biopharmaceutical production. In such process, the solids particles can be or can contain bacteria. While of more general application, the process will be described below in the context of wastewater treatment.

In the area of wastewater treatment, the invention relates more specifically to biological treatment of wastewater as may be performed in a plant by process broadly illustrated in FIG. 1. In the treatment process, an influent wastewater stream 10 may be pretreated 12, which may include a bar screen grit remover, etc. After pretreatment, the wastewater stream is introduced into a reactor 14. Generally, reactor 14 is where the biological treatment occurs. It will be appreciated that more than one reactor may be used in a wastewater treatment plant.

Biological treatment of wastewater utilizes microorganisms or biomass to treat the wastewater. Microorganisms can perform a variety of treatment processes. For example, some microorganisms can reduce or remove biological oxygen demand (BOD), while other microorganisms can perform nitrification, perform denitrification, or remove phosphorous. Often there will be more than one type of microorganism introduced across multiple reactors to achieve the final purified water.

After biological treatment, the process stream from reactor 14 is introduced into a first separation zone, or clarifier 16. Clarifier 16 will typically use gravity settling, clarifier 16 may be a tank having one of a variety of shapes, such as, rectangular, cone shape, circular, elliptical, and so on. Clarifier 16 settles the heavier solids from the process stream. The clarified wastewater is taken off as effluent 17. The resulting underflow 18 is introduced into second separation zone or tank zone 19.

Figure 2:
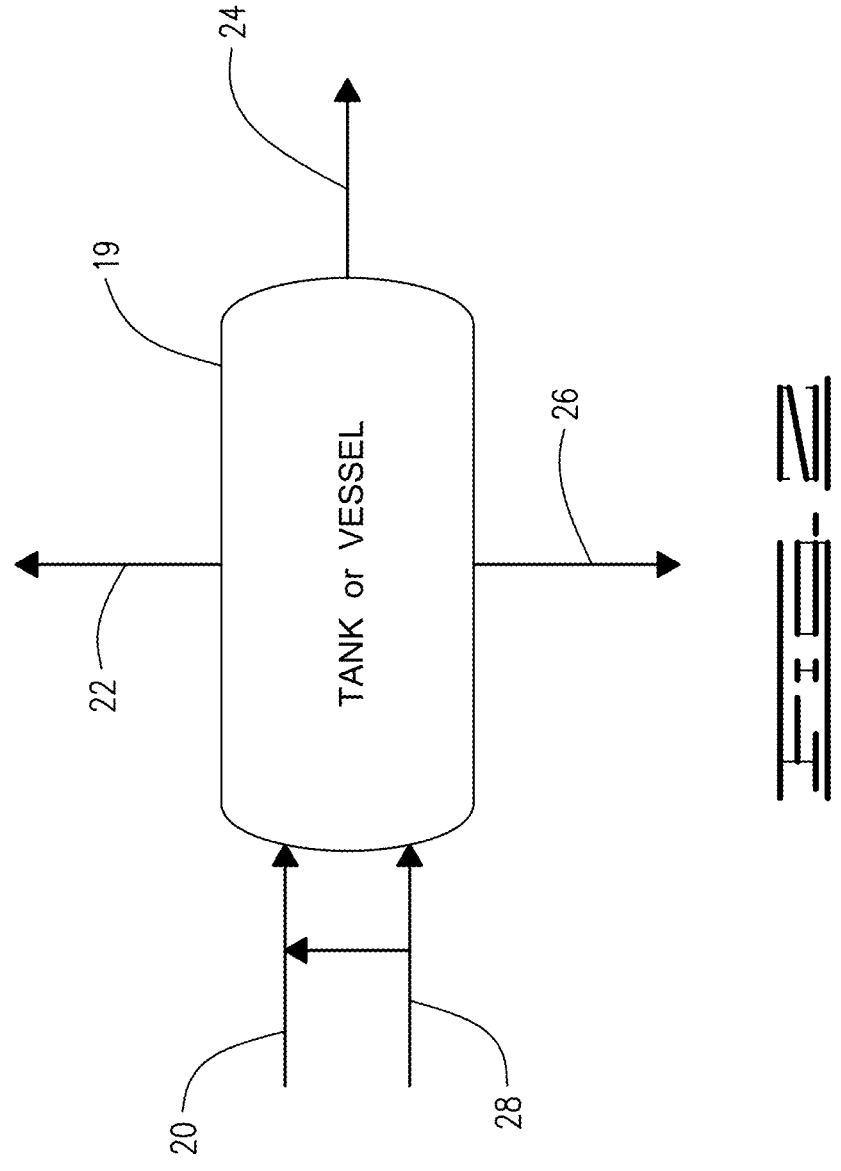
FIG. 2 is a schematic illustration of a separation method in accordance with one embodiment of this disclosure.

As shown in FIG. 2, the second separation zone generally comprises a tank or vessel designed to receive flow of the process fluid 20. Generally, the process fluid 20 will be introduced in either a continuous or semi-continuous manner. In accordance with the description above, the process fluid is generally an aqueous fluid containing solids particles, typically inert particles and/or bacteria.

As shown in FIG. 1, the separation zone can have one or more recycle streams or return activated sludge (RAS) streams. For example, stream 21 is recycled or returned to the reactor 14 without processing in secondary separation zone 19.

Additionally, the process of wastewater treatment, as described, requires the removals of solids or bacteria from the process. This periodic or continuous removal allows for maintenance of the process and bacteria populations. The current system has the ability to remove only a portion of the solids or bacteria from at least one of three exits or outlets. Accordingly, three take off stream can be removed from the tank zone each having a different portion of the solids or bacteria, or optionally with one or more having no solids or bacteria. Accordingly, as shown in FIGS. 1 and 2, there are at least a first stream 22 removed from the upper portion of the tank zone 19, a second stream 24 removed from the mid-portion of the tank zone, and a third stream 26 removed from the lower portion.

The three streams 22, 24 and 26 are typically aqueous streams divided from the process stream but differ in that each contains a different portion of the solids particles. Accordingly, first stream 22 contains the portion solid particles with the lowest average density, third stream 26 contains the portion of solid particles with the highest average density, and second stream 24 contains a portion of solid particles with an average density between that contained in the first stream 22 and in the third stream 26, that is a medium average density. Generally, all or part or none of these separated streams will be recycled back to the reactor 14. For example, in waste water treatment, typically all of third stream 26 (containing the highest average density solids particles) will be returned to reactor 14, a portion of second stream 24 (containing the medium average density particles) will be recycled back to reactor 14, and none of the first stream 22 (with the lowest average density particles) will be returned to reactor 14 from tank 19. The remaining portion of second stream 24 and all of stream 26 can be taken off for further treatment as necessary.

The separation into the three streams is effected by controlling the flow of aqueous fluid out of one or more of the outlets and by introducing a gas into the tank zone. As illustrated, gas 28 is introduced, either directly into the tank zone or into the process fluid stream before it enters the tank zone. Generally, the gas should be introduced so as to maximize the contact time with the gas and solids particles in the process liquid.

Gas is introduced so as to generate gas bubbles in the process liquid such that the gas bubbles attach to the lowest density portion of the solids particles thus promoting upward flow of these solids particles within the tank zone. Gas is introduced into the tank zone as either a gas stream or with a liquid carrier, such as an aqueous liquid. The gas can be combined with a specific carrier fluid via a mechanical device under high pressure, under atmospheric pressure or under vacuum. For example, the gas and carrier fluid can be combined in a venturi injection device or in a pump. For example, the gas can be air, nitrogen, carbon dioxide or other gas.

Flow through the tank zone can be controlled by any suitable means that will result in increasing or decreasing the flow of process liquid through one of the effluent streams of the separation zone. For example, flow can be controlled by valves located at one or more of the outlets to the tank zone.

Figure 4:
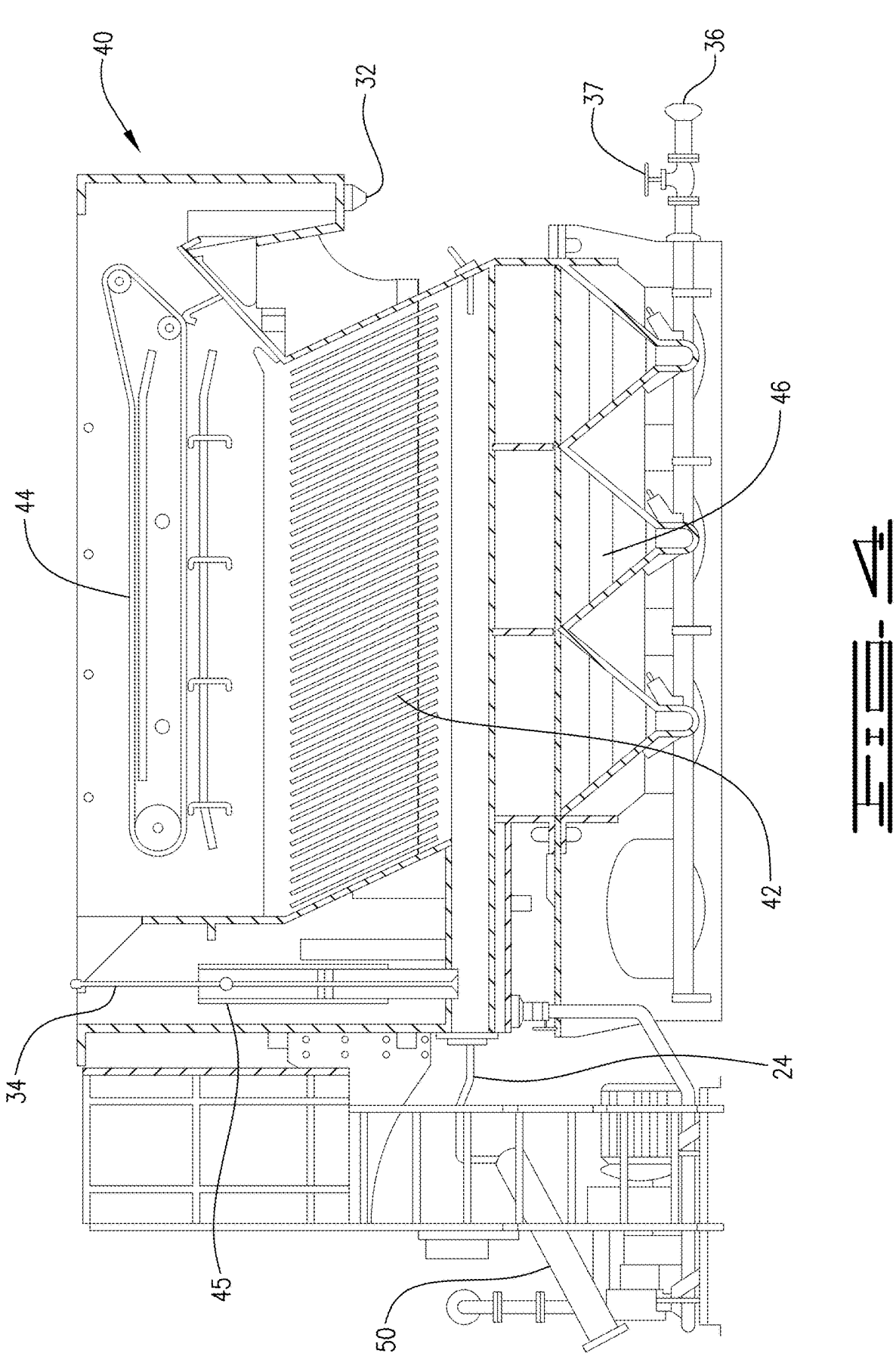
FIG. 4 is a schematic illustration of a tank designed for carrying out the method of FIG. 2.

Turning now to FIG. 4, a vessel 40 suitable for use as the tank zone is illustrated. The vessel has outlets 32, 34 and 36 associated with the three effluent streams. Flow through the vessel can be controlled by a valve 37 at outlet 36 corresponding to third stream 26 having the highest average density solids particles; however, for some embodiments, a valve would also be at the outlet for the second stream 24 (from outlet 34) with the first stream 22 (from outlet 32) have no valve or flow control device.

In the embodiment illustrated in FIG. 4, the first stream 22 (from outlet 32) is formed by skimming solids particles and process fluid from the upper surface of the process fluid in the vessel. The solids particles at the surface have the lowest average density of the solids particles and their effective density has been lowered more by the attachment of gas bubbles, which facilitates their movement to the surface. Intermixing and attachment of the gas bubbles to the solids particles can be facilitated by lamella inclined plates 42. As illustrated, gas is introduced by line 24 by a gas flow device 50 (with or without a carrier fluid). The solids particles can be skimmed off the surface by any suitable device 44, such as by a chain and flight skimming system, a scoop, or other mechanism.

Second stream 24 (from outlet 34), which has the solids particles of medium average density solids, is removed by telescoping valve or similar 45 which draws liquid process fluid from the center region of the vessel.

Third stream 26 (from outlet 36) is drawn from the bottom portion of the vessel through outlet 36, and its flow is controlled by a valve 37. By adjusting valve 37, flow of process fluid can be increased or decreased through the bottom portion 46 of the vessel. It has been discovered that changing the percentage of process fluid flowing through the bottom portion 46 of the vessel 40 can have a substantial effect on the solids particles removed at each outlet and thus can enhance the separation of the solids particles within the process fluid. An example of the change in process fluid flow and its effect on solids particles can be seen by comparing FIGS. 5 and 6. Typically, the third stream 26 is returned to the treatment process. Additionally, a portion of second stream 24 can be returned to the treatment process. Accordingly, by controlling the solids particles composition of these streams, greater control of the treatment process can be achieved. FIGS. 5 and 6 show that, with changes in the flow leaving the upper outlet 32 device, the mass leaving in the middle and bottom outlets 34 and 36 can be controlled. Increasing the flow from the upper outlet 32 reduces the mass leaving in the middle and bottom outlets 34 and 36. Decreasing the flow from the upper outlet 32 increases the mass leaving from the middle and bottom outlets 34 and 36.

As will be realized from the discussion herein, typically the flow through outlet 32 is not increased or decreased by a valve at outlet 32, but rather by change flow at valve 37 associated with outlet 36. In some cases, flow through outlet 32 will be changed by adjusting valve 37 associated with outlet 36 and/or adjusting a valve associated with outlet 36.

Figure 3:
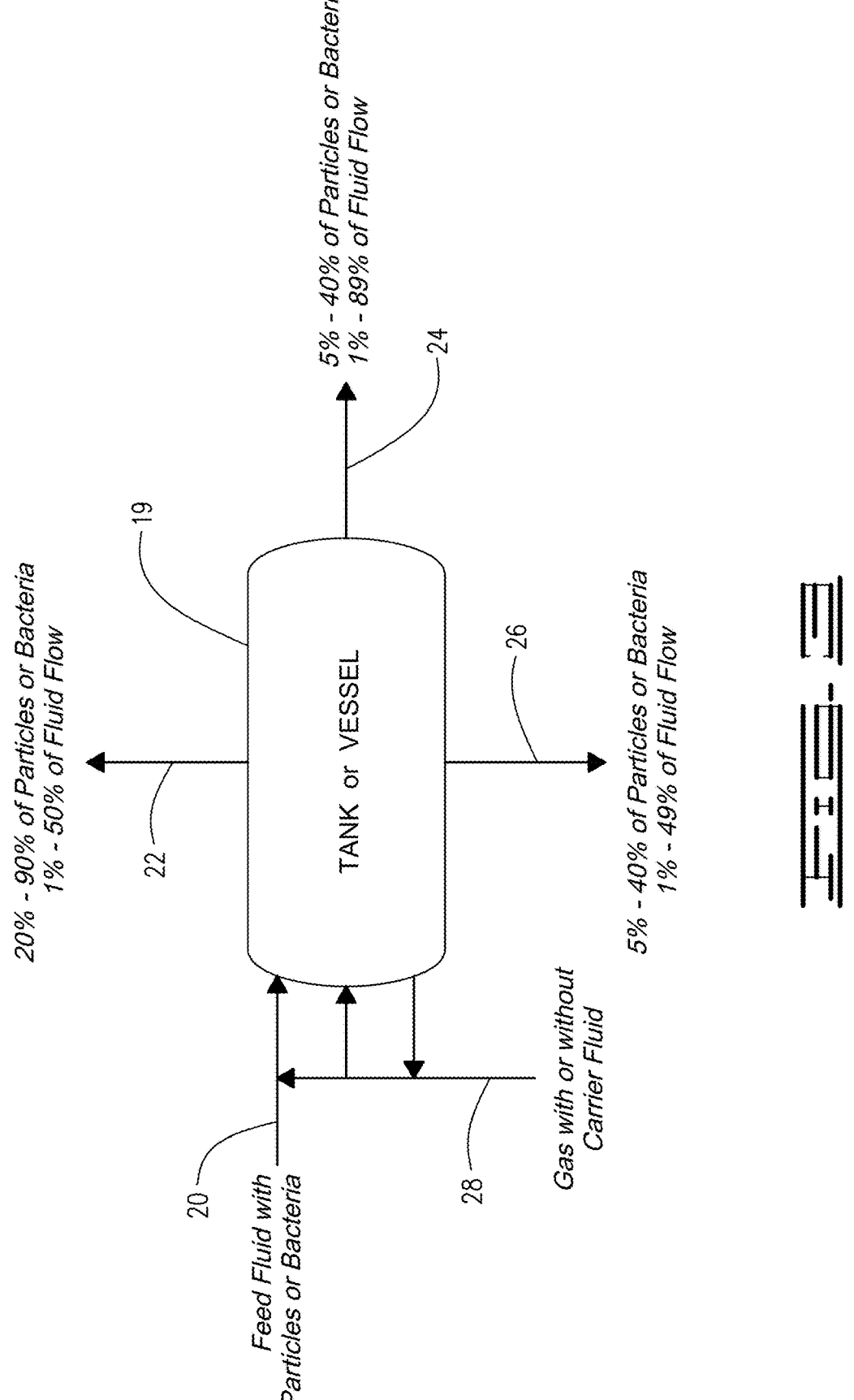
FIG. 3 is a schematic illustration of the method of FIG. 2 with indications of representative flows and bacteria amounts.

FIG. 3 illustrates typical ranges for process fluid flows for the three effluent streams, and the percentage ranges of solids particles generally removed by each stream when a separation vessel is operated in accordance with this disclosure. While broadly 20% to 90% of the solids particles can be removed through the first stream by adjusting the flow with valve 37 (and/or a valve on the second stream 24) such that 1% to 50% of the fluid in tank 19 comes off through outlet 32 (greater flow equaling greater solids particles through outlet 32). Generally, the tank zone will be operated to remove 20% to 50% of the solids particles through the first stream. Additionally, generally 5% to 40% of the solids particles will be removed through the third stream by adjusting valve 37 such that 10% to 49% of the fluid flow is through outlet 36, but more typically, the flow through outlet 36 will be adjusted to remove 20% to 40% of the solids particles through outlet 36. The remaining fluid (about 1% to 89% of fluid flow) and solids particles (about 5% to 40% of solids particles or bacteria) is removed through outlet 34.

Residence time within the tank zone can vary in order to optimize separation but typically will be 1 to 30 minutes. Chemicals can be added to the process fluid in order to provide improved performance. For example, flocculants and coagulants can be added.

While systems and methods are described in terms of "comprising," "containing," or "including" various components or steps, the systems and methods also can "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Additionally, where the term "about" is used in relation to a range it generally means plus or minus half the last significant figure of the range value, unless context indicates another definition of "about" applies.

Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A method for selectively separating solids from a process stream from a treatment or production process, the method comprising:

introducing the process stream into a separation zone having an upper portion, a lower portion and a mid-portion between the upper portion and lower portion, wherein the process stream is a process liquid containing solids particles;

introducing a gas containing stream into the separation zone so as to generate gas bubbles in the process liquid such that the gas bubbles attach to a first portion of the solids particles thus promoting upward flow of the first portion of the solids particles within the separation zone;

removing the first portion of the solids particles from the upper portion;

removing a second portion of the solids particles from the mid-portion;

removing a third portion of the solids particles from the lower portion;

controlling flow of process liquid removed with the first portion, removed with the second portion and removed with the third portion so as to control amounts of solids particles in the first portion, second portion and third portion such that the first portion contains from 20% to 90% of the solid particles contained in the process stream, the second portion contains from 5% to 40% of the solid particles contained in the process stream, and the third portion contains from 5% to 40% of the solid particles contained in the process stream.

2. The method of claim 1, wherein average density of the third portion is greater than average density of the second portion and average density of the second portion is greater than average density of the first portion.

3. The method of claim 2, wherein the third portion of solids is removed from the lower portion by flow of process fluid through a lower outlet in the lower portion of the separation zone, and wherein the second portion of solids is removed from the mid-portion by flow of process fluid through a mid-outlet in the mid-portion of the separation zone, and wherein the flow of process liquid removed with the first portion, the second portion and the third portion is controlled by changing the flow through the lower outlet, the mid-outlet or both.

4. The method of claim 3, wherein the process fluid forms an upper surface within the tank zone, and the first portion of the solids is removed by skimming off the upper surface.

5. The method of claim 4, wherein at least a portion of the third portion is recycled back to the treatment or production process.

6. The method of claim 5, wherein a portion of the second portion is recycled back to the treatment or production process.

7. The method of claim 6, wherein the process stream is from a wastewater treatment process and the solids particles include bacteria.

8. The method of claim 1, wherein the step of controlling flow of the process liquid is carried out such that the first portion contains from 20% to 50% of the solid particles contained in the process stream, the second portion contains from 5% to 40% of the solid particles contained in the process stream, and the third portion contains from 20% to 40% of the solid particles contained in the process stream.

9. The method of claim 1, wherein the step of controlling flow of the process liquid includes adjusting the flow removed with the first portion, the second portion or the third portion so as to change the amount solid particles contained in the first portion, second portion and third portion.

10. The method of claim 9, wherein the third portion of solids is removed from the lower portion by flow of process fluid through a lower outlet in the lower portion of the separation zone, and wherein the second portion of solids is removed from the mid-portion by flow of process fluid through a mid-outlet in the mid-portion of the separation zone, and wherein the flow of process liquid removed with the first portion, the second portion and the third portion is controlled by changing the flow through the lower outlet, the mid-outlet or both.

11. The method of claim 10, wherein at least a portion of the third portion is recycled back to the treatment or production process.

12. The method of claim 11, wherein a portion of the second portion is recycled back to the treatment or production process.

13. The method of claim 10, wherein the flow of process liquid removed with the first portion, the second portion and the third portion is controlled by changing flow through the lower outlet and thus adjusting the amounts of solids removed with the first portion, the second portion and the third portion.

14. The method of claim 13, wherein the process stream is from a wastewater treatment process and the solids particles include bacteria.

15. The method of claim 14, wherein the step of controlling flow of the process liquid is carried out such that the first portion contains from 20% to 50% of the solid particles contained in the process stream, the second portion contains from 5% to 40% of the solid particles contained in the process stream, and the third portion contains from 20% to 40% of the solid particles contained in the process stream.

16. The method of claim 14, wherein none of the first portion is recycled back to the treatment or production process and wherein at least a portion of the third portion is recycled back to the treatment or production process.

17. The method of claim 16, wherein a portion of the second portion is recycled back to the treatment or production process.

* * * * *